United States Patent
Park et al.

(10) Patent No.: US 9,418,785 B2
(45) Date of Patent: Aug. 16, 2016

(54) WIRELESS POWER TRANSMISSION SYSTEM WITH ENHANCED MAGNETIC FIELD STRENGTH

(75) Inventors: Eun Seok Park, Yongin-si (KR); Ki Young Kim, Yongin-si (KR); Young Ho Ryu, Seongnam-si (KR); Sang Wook Kwon, Seongnam-si (KR); Nam Yun Kim, Seoul (KR); Dong Zo Kim, Yongin-si (KR); Yun Kwon Park, Dongducheon-si (KR); Chang Wook Yoon, Seoul (KR); Jin Sung Choi, Seoul (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 910 days.

(21) Appl. No.: 13/616,347

(22) Filed: Sep. 14, 2012

(65) Prior Publication Data

US 2013/0134791 A1 May 30, 2013

(30) Foreign Application Priority Data

Nov. 29, 2011 (KR) .................. 10-2011-0125811

(51) Int. Cl.
*H02J 5/00* (2016.01)
*H01F 38/14* (2006.01)

(52) U.S. Cl.
CPC .. *H01F 38/14* (2013.01); *H02J 5/00* (2013.01)

(58) Field of Classification Search
USPC .......................................................... 307/104
See application file for complete search history.

(56) References Cited

U.S. PATENT DOCUMENTS

| 2010/0219694 A1 | 9/2010 | Kurs et al. | |
| 2011/0133568 A1* | 6/2011 | Wang ................ | H02J 17/00 307/104 |

FOREIGN PATENT DOCUMENTS

| JP | 2008-244683 A | 10/2008 |
| KR | 10-2010-0084053 A | 7/2010 |

* cited by examiner

*Primary Examiner* — Thienvu Tran
*Assistant Examiner* — David M Stables
(74) *Attorney, Agent, or Firm* — NSIP Law

(57) ABSTRACT

A wireless power transmission system with an enhanced magnetic field strength is provided. A wireless power transmitter includes a generator configured to generate a power. The wireless power transmitter further includes a resonator configured to generate a magnetic field to transmit the power to a target device. The wireless power transmitter further includes a slab unit configured to enhance the magnetic field.

9 Claims, 16 Drawing Sheets

WIRELESS POWER TRANSMISSION SYSTEM WITH ENHANCED MAGNETIC FIELD STRENGTH

CROSS-REFERENCE TO RELATED APPLICATION(S)

This application claims the benefit under 35 U.S.C. §119 (a) of Korean Patent Application No. 10-2011-0125811, filed on Nov. 29, 2011, in the Korean Intellectual Property Office, the entire disclosure of which is incorporated herein by reference for all purposes.

BACKGROUND

1. Field

The following description relates to a wireless power transmission system with an enhanced magnetic field strength.

2. Description of Related Art

In a wireless power transmission using a resonance scheme, a transmission efficiency may sharply decrease based on a transmission distance when a size of a resonator is determined. Accordingly, in order to apply the wireless power transmission using the resonance scheme to various devices, the transmission efficiency may need to be increased.

In order to increase the transmission distance and the transmission efficiency, an additional resonator may be inserted into the wireless power transmission, and used as a repeater. However, the insertion of the repeater resonator may be limited in practical applications.

In addition, when the size of the resonator is determined, it may be difficult to control properties of the resonator, e.g., a quality (Q) value. In order to increase the Q value, a material to be used to manufacture the resonator, and properties of a reactive component for resonance, may need to be improved. However, there may be a limit to increasing the Q value using the aforementioned factors due to a limit in the material.

SUMMARY

In one general aspect, there is provided a wireless power transmitter including a generator configured to generate a power. The wireless power transmitter further includes a resonator configured to generate a magnetic field to transmit the power to a target device. The wireless power transmitter further includes a slab unit configured to enhance the magnetic field.

The slab unit may include a metamaterial. A permittivity of the metamaterial and/or a permeability of the metamaterial may include a negative value.

The slab unit may include metamaterial. A relative permittivity of the metamaterial and a relative permeability of the metamaterial may be identical to each other.

The slab unit may include a metamaterial. A relative permeability of the metamaterial may greater than a value of 1. A magnitude of a relative permittivity of the metamaterial and a magnitude of the relative permeability may be identical to each other.

The slab unit may include a metamaterial. A difference between a relative permittivity of the metamaterial and a relative permeability of the metamaterial may be less than 20%.

The slab unit may include a metamaterial including an electric dipole structure configured to determine a relative permittivity of the metamaterial, and a magnetic dipole structure configured to determine a relative permeability of the metamaterial.

The electric dipole structure and the magnetic dipole structure may be arranged in the slab unit in a form of an array.

The magnetic dipole structure may include a loop-shaped conductor configured to generate a capacitance associated with a resonance characteristic.

An area the slab unit may be greater than or equal to an area of the resonator.

The resonator and the slab unit may be configured into a single package.

The slab unit may include a metamaterial. An impedance of the metamaterial and an impedance of air may be identical to each other.

In another general aspect, there is provided an apparatus configured to enhance a magnetic field strength in a wireless power transmission system, the apparatus including an electric dipole structure configured to determine a relative permittivity of the apparatus. The apparatus further includes a magnetic dipole structure configured to determine a relative permeability of the apparatus. The apparatus is configured to enhance a magnetic field between a source device and a target device.

The electric dipole structure may include a wire. The relative permittivity of the apparatus may include a negative value.

The magnetic dipole structure may include a split-ring resonator. The relative permeability of the apparatus may include a negative value.

In still another general aspect, there is provided a wireless power receiver including a resonator configured to receive a power using a magnetic field formed between a source device and the resonator. The wireless power receiver further includes a power supply device configured to supply the received power to a load. The wireless power receiver further includes a slab unit configured to enhance the magnetic field.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
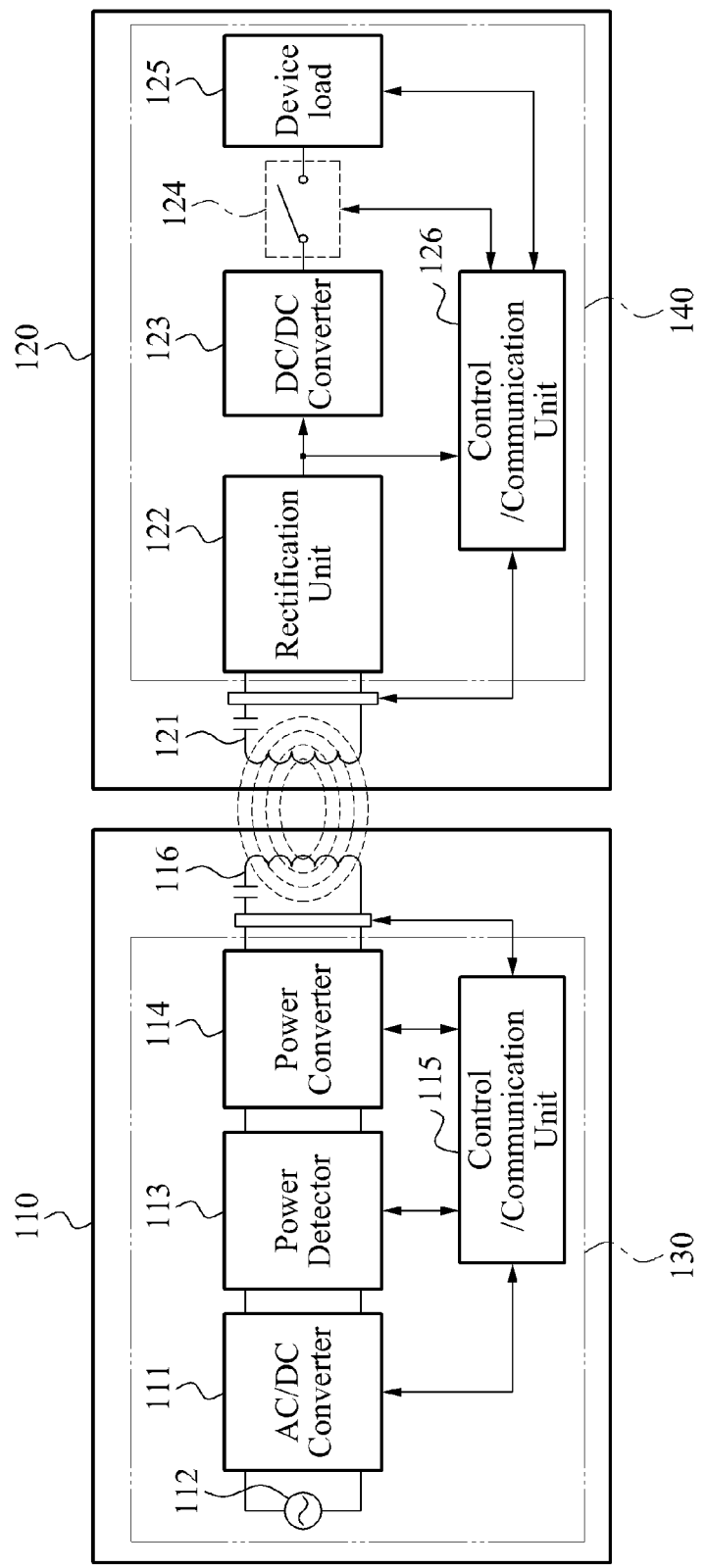
FIG. 1 is a diagram illustrating an example of a wireless power transmission system.

FIG. 1 illustrates an example of a wireless power transmission system. Referring to FIG. 1, the wireless power transmission and charging system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes an alternating current-to-direct current (AC/DC) converter 111, a power detector 113, a power converter 114, a control and communication (control/communication) unit 115, and a source resonator 116.

The target device 120 includes a target resonator 121, a rectification unit 122, a DC-to-DC (DC/DC) converter 123, a switch unit 124, a device load 125, and a control/communication unit 126.

The AC/DC converter 111 generates a DC voltage by rectifying an AC voltage having a frequency of tens of hertz (Hz) output from a power supply 112. The AC/DC converter 111 may output a DC voltage having a predetermined level, or may output a DC voltage having an adjustable level by the control/communication unit 115.

The power detector 113 detects an output current and an output voltage of the AC/DC converter 111, and provides, to the control/communication unit 115, information on the detected current and the detected voltage. Additionally, the power detector 113 detects an input current and an input voltage of the power converter 114.

The power converter 114 generates a power by converting the DC voltage output from the AC/DC converter 111 to an AC voltage using a switching pulse signal having a frequency of a few kilohertz (kHz) to tens of megahertz (MHz). In other words, the power converter 114 converts a DC voltage supplied to a power amplifier to an AC voltage using a reference resonance frequency $F_{Ref}$, and generates a wake-up power, or a charging power to be used for charging that may be used in a plurality of target devices. The wake-up power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

The control/communication unit 115 may control a frequency of the switching pulse signal used by the power converter 114. The control/communication unit 115 may perform out-of-band communication using a communication channel. The control/communication unit 115 may include a communication module, such as a ZigBee module, a Bluetooth module, or any other communication module, that the control/communication unit 115 may use to perform the out-of-band communication. The control/communication unit 115 may transmit or receive data to or from the target device 120 via the out-of-band communication.

The source resonator 116 transfers electromagnetic energy, such as the communication power or the charging power, to the target resonator 121 via a magnetic coupling with the target resonator 121.

The target resonator 121 receives the electromagnetic energy, such as the communication power or the charging power, from the source resonator 116 via a magnetic coupling with the source resonator 116. Additionally, the target resonator 121 receives various messages from the source device 110 via the in-band communication.

A figure of merit of the target resonator 121 may satisfy a power dividing ratio of the source device 110. The figure of merit of the target resonator 121 and the power dividing ratios of the source device 110 will be described in detail with reference to FIGS. 2 through 10.

The rectification unit 122 generates a DC voltage by rectifying an AC voltage received by the target resonator 121.

The DC/DC converter 123 adjusts a level of the DC voltage output from the rectification unit 122 based on a voltage rating of the device load 125. For example, the DC/DC converter 123 may adjust the level of the DC voltage output from the rectification unit 122 to a level in a range from 3 volts (V) to 10 V.

The switch unit 124 is turned on or off by the control/communication unit 126. When the switch unit 124 is turned off, the control/communication unit 115 of the source device 110 may detect a reflected wave. In other words, when the switch unit 124 is turned off, the magnetic coupling between the source resonator 116 and the target resonator 121 is interrupted.

The device load 125 may include a battery. The device load 125 may charge the battery using the DC voltage output from the DC/DC converter 123.

The control/communication unit 126 is activated by the wake-up power. The control/communication unit 126 communicates with the source device 110, and controls an operation of the target device 120.

In FIG. 1, the rectification unit 122, the DC/DC converter 123, and the switch unit 124 may be referred to as a power supplying unit. Accordingly, the target device 120 includes the power supplying unit supplying a power received from the source device 110 to the device load 125. The device load 125 may be simply referred to as a load.

Further, the source device 110 may be classified into the source resonator 116 and a source system 130, e.g., a generator. The source resonator 116 may correspond to a rectangular loop resonator illustrated in FIGS. 16A through 17B. The source system 130 generates a wireless power, and transmits the generated wireless power to the target device 120 through the source resonator 116 corresponding to a multi-mode resonator.

The target device 120 may be classified into the target resonator 121 and a target system 140, e.g., a power supply device. The target resonator 121 may correspond to the rectangular loop resonator illustrated in FIGS. 16A through 17B. The target system 140 receives the wireless power from the source device 110 through the target resonator 121 corresponding to a multi-mode resonator, and supplies the received wireless power to a load.

Figure 2:
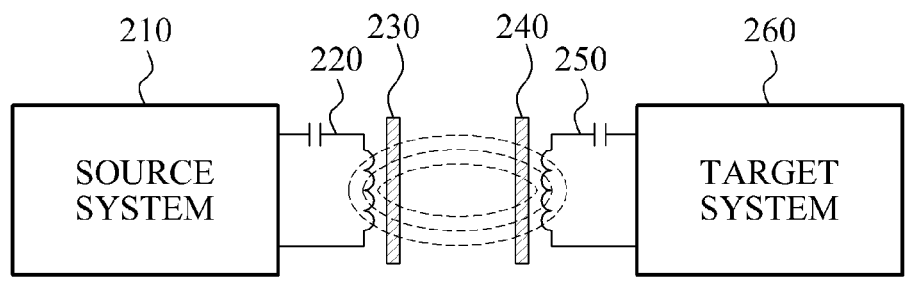
FIG. 2 is a diagram illustrating another example of a wireless power transmission system.

FIG. 2 illustrates another example of a wireless power transmission system. Referring to FIG. 2, the wireless power transmission includes a source device and a target device. The source device includes a source system 210, a source resonator 220, and a slab unit 230. The target device includes a slab unit 240, a target resonator 250, and a target system 260.

The source system 210 may correspond to the source system 130 of FIG. 1. That is, the source system 210 generates a wireless power, and transmits the wireless power to the target device. In this example, the wireless power may refer to a power transferred wirelessly through a coupling of a magnetic field.

The source resonator 220 may correspond to the source resonator 116 of FIG. 1. That is, the source resonator 220 generates the magnetic field to transmit the wireless power to the target device using a resonance between the source resonator 220 and the target resonator 250.

The slab unit 230 enhances the magnetic field of the source resonator 220. The slab unit 240 enhances the magnetic field between the source resonator 220 and the target resonator 250.

The target resonator 250 may correspond to the target resonator 121 of FIG. 1. That is, the target resonator 250 receives the wireless power from the source device using the magnetic field and the resonance between the source resonator 220 and the target resonator 250.

The target system 260 may correspond to the target system 140 of FIG. 1. That is, the target system 260 receives the wireless power from the source device, and supplies the received power to a load.

Each of the slab unit 230 and the slab unit 240 may include a metamaterial. Accordingly, each of the slab unit 230 and the slab unit 240 may be referred to as a metamaterial slab. Also, each of the slab unit 230 and the slab unit 240 may be referred to as an apparatus configured to enhance a magnetic field strength in a resonance-type wireless power transmission system.

A permittivity of the metamaterial and/or a permeability of the metamaterial may include a negative value. In this example, a relative permittivity of the metamaterial and a relative permeability of the metamaterial may be identical to each other. Also, the relative permeability may be greater than a value of 1, and a magnitude of the relative permittivity may be identical to a magnitude of the relative permeability. If the relative permittivity and the relative permeability are different from each other, a difference between the relative permittivity and the relative permeability may be predetermined to be less than 20%.

The relative permittivity of the metamaterial may be adjusted by inserting an electric dipole structure into the metamaterial slab. Also, the relative permeability of the metamaterial may be adjusted by inserting a magnetic dipole structure into the metamaterial slab. Accordingly, the metamaterial slab may include the electric dipole structure configured to determine the relative permittivity, and the magnetic dipole structure configured to determine the relative permeability. Also, only one of the electric dipole structure and the magnetic dipole structure may be inserted into the metamaterial slab.

A form of inserting the electric dipole structure and the magnetic dipole structure into the metamaterial slab may not be limited. That is, various schemes of inserting the electric dipole structure and the magnetic dipole structure into the metamaterial slab may be used based on a scheme of determining the relative permittivity and the relative permeability of the metamaterial. For example, the electric dipole structure and the magnetic dipole structure may be arranged in the metamaterial slab in a form of an array.

When both a relative epsilon (i.e., permittivity) value and a relative mu (i.e., permeability) value, among magnetic properties of a material, equal a value of −1, that is, the material corresponds to a double negative (DNG) material, an evanescent wave is enhanced in the material. Also, when the relative epsilon value or the relative mu value equals a negative value, a near magnetic field is enhanced in the material. That is, when a relative epsilon value and/or a relative mu value of the metamaterial slab equals a negative value, the metamaterial slab amplifies a near magnetic field.

Referring again to FIG. 2, the slab unit 230 amplifies the magnetic field generated in the source resonator 220. Also, the magnetic field amplified by the slab unit 230 is transmitted to the target resonator 250 through coupling. The slab unit 240 disposed in front of the target resonator 250 amplifies a strength of the magnetic field once more.

Amplification or enhancement of the magnetic field increases a transmission distance and a transmission efficiency of wireless power transmission. An increasing strength of the magnetic field may become even greater based on a thickness of the metamaterial slab. For example, as the thickness of the metamaterial slab increases, the strength of the magnetic field increases, thereby increasing the power transmission distance and the power transmission efficiency. Also, an area or a size of the metamaterial slab may be greater than or equal to an area or a size of a resonator.

Figure 3:
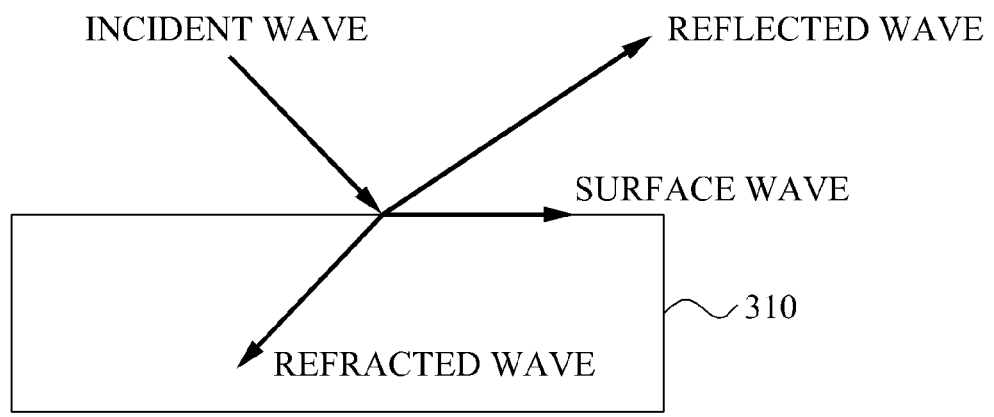
FIG. 3 is a diagram illustrating an example of wave properties based on use of a metamaterial slab.

FIG. 3 illustrates an example of wave properties based on use of a metamaterial slab 310. Referring to FIG. 3, an incident wave is divided into a refracted wave that passing through the metamaterial slab 310, a reflected wave reflected by the metamaterial slab 310, and a surface wave on a surface of the metamaterial slab 310.

The reflected wave and the surface wave correspond to waves lost in an aspect of transmission. The reflected wave and the surface wave may be minimized or eliminated in order to increase an effect of using the material slab 310. For example, when the surface of the metamaterial slab 310 does not include a conductor component, the surface wave may not be generated.

The reflected wave may result from a difference in impedance between the air and the metamaterial slab 310. That is, an impedance of the air may equal $120\pi$ (impedance=$\mu_0\mu_r/\epsilon_0\epsilon_r$=$120\pi$, where relative mu ($\mu_r$)=relative epsilon ($\epsilon_r$)=1 in air). The metamaterial slab 310 may include a relative epsilon value and a relative mu value that are different than a value of 1, and accordingly, an impedance of the metamaterial slab 310 does not equal $120\pi$. In this example, the difference in impedance between the air and the metamaterial slab 310 occurs, and the reflected wave is generated.

Thus, to minimize or eliminate the reflected wave, a magnitude of the impedance of the metamaterial slab 310 may be set to $120\pi$, which may be identical to a magnitude of the impedance of the air. That is, when a magnitude of a refractive index value of the metamaterial slab 310 equals a value of 1, the metamaterial slab 310 amplifies a near field, and wave loss in using the metamaterial slab 310 may not occur.

In wireless power transmission using a resonance scheme, a power is transmitted using a magnetic field. A strength of the magnetic field is proportional to a mu value in a magnetic material including a relative mu value greater than a value of 1. Accordingly, by enabling the metamaterial slab 310 to include magnetic properties, that is, to include a relative mu value greater than a value of 1, the strength of the magnetic field is enhanced.

When a mu value and/or an epsilon value equals a negative value, the metamaterial slab 310 enhances a near field in the metamaterial slab 310. In this example, when the metamaterial slab 310 includes properties of a magnetic material, the strength of the magnetic field passing through the metamaterial slab 310 is amplified.

When a permittivity (i.e., the epsilon value) and a permeability (i.e., the mu value) of the metamaterial slab 310 are identical to each other, the reflected wave resulting from impedance mismatching may be eliminated. That is, when the relative mu value of the metamaterial slab 310 equals n or −n, and the metamaterial slab 310 includes properties of a magnetic material, a magnitude of the relative epsilon value of the metamaterial slab 310 may become identical to a magnitude of the relative mu value.

A method of predetermining only the permittivity of the metamaterial slab 310 to be a negative value, between the permittivity and the permeability, may include, for example, a method of using a wire, and/or other various methods known to one of ordinary skill in the art. Also, the permeability may be predetermined to be a negative value using a split-ring resonator (SRR). The relative mu value may be predetermined to be a negative value using another type of magnetic resonator. Also, a method of predetermining both the permittivity and the permeability to be negative values may include simultaneously inserting structures including negative epsilon and negative mu properties into the metamaterial slab 310.

Hereinafter, examples of predetermining a metamaterial slab to include negative values of a permittivity and/or a permeability will be described with reference to FIGS. 4 through 6.

Figure 4:
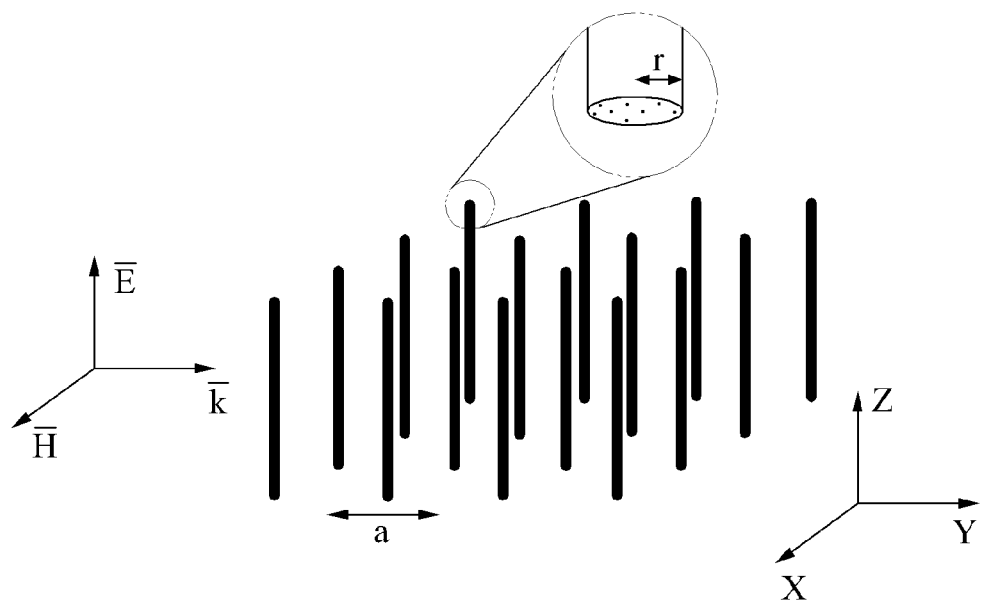
FIG. 4 is a diagram illustrating an example of a thin wire array structure.

FIG. 4 illustrates an example of a thin wire array structure. The thin wire array structure includes artificial plasma properties. That is, when a wave enters in parallel into the thin wire array structure, a plasma epsilon value of the thin wire array structure may be defined as expressed by the example of Equation 1.

$$\varepsilon_p = \varepsilon_0 \left(1 - \frac{\omega_p^2}{\omega^2}\right) = \varepsilon_0 \left(1 - \frac{f_p^2}{f^2}\right), \quad (1)$$

where ω denotes an angular frequency of a resonance frequency f.

The plasma epsilon value may be predetermined to equal a negative value based on a plasma angular frequency $\omega_p$. In this example, the plasma angular frequency $\omega_p$ may be defined as expressed by the example of Equation 2.

$$\omega_p^2 = \frac{n_{eff} e^2}{\varepsilon_0 m_{eff}} = \frac{2\pi c_0^2}{a^2 \ln(a/r)} \quad (2)$$

-continued
$$\begin{cases} n_{eff} = n\pi r^2 / a^2 \\ m_{eff} = \frac{\mu_0 e^2 \pi r^2 n}{2\pi} \ln(a/r) \end{cases},$$

where n denotes a constant, and e denotes an amount of charge on an electron. As shown in FIG. 4, a denotes an interval of a thin wire array, and r denotes a radius of a wire. c denotes the speed of light in free space.

Accordingly, by properly predetermining the interval of the thin wire array, and the radius of the wire, a desired frequency and a desired epsilon value (e.g., desired epsilon properties) may be predetermined. For example, to predetermine a desired epsilon value of a metamaterial slab to equal a negative value (e.g., include negative epsilon properties) at a desired frequency, a thin wire array may be inserted into the metamaterial slab, and a proper arrangement (i.e., a predetermined interval and a predetermined wire radius) of the thin wire array may be formed. That is, the metamaterial slab with the various negative epsilon properties may be manufactured.

Figure 5:
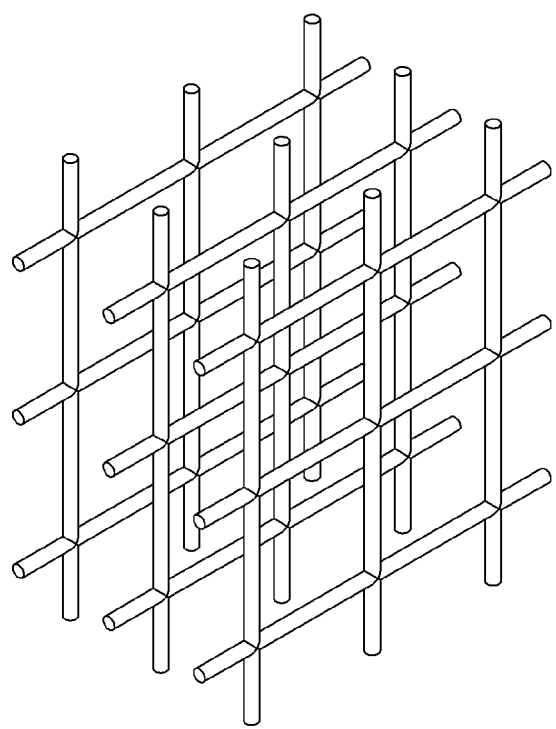
FIGS. 5 and 6 are diagrams illustrating other examples of a thin wire array structure.
Figure 6:
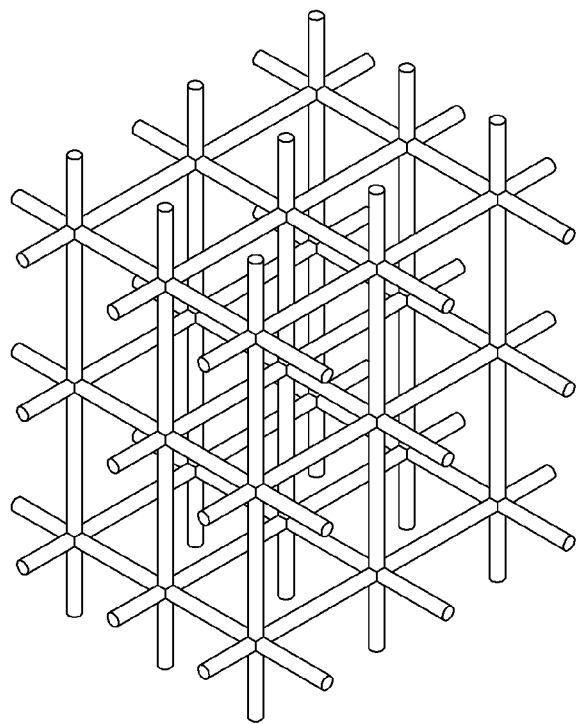

FIGS. 5 and 6 illustrate other examples of a thin wire array structure. The thin wire array structure includes unit cells of an electric dipole structure to include artificial plasma properties, and includes a proper array arrangement (i.e., of a predetermined interval and predetermined wire radius) to include negative epsilon properties.

FIG. 5 illustrates an example of a two-dimensional array structure of conducting wires, and FIG. 6 illustrates an example of a three-dimensional array structure of conducting wires. The array structure of FIG. 4 may correspond to an example of a one-dimensional array structure of conducting wires.

Hereinafter, a method of manufacturing a metamaterial slab with mu negative properties (i.e., a negative mu value) will be described with reference to FIGS. 7 through 13.

Figure 7:
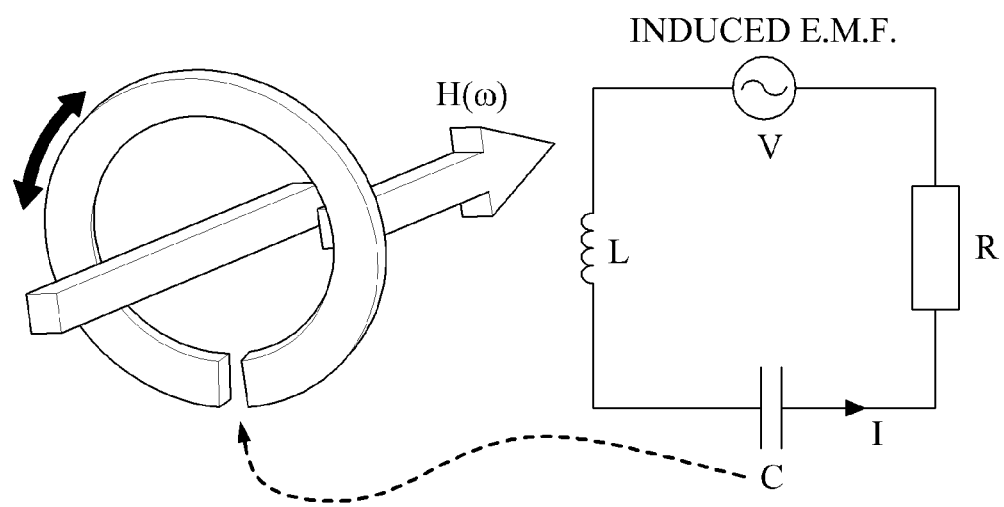
FIG. 7 is a diagram illustrating an example of a split-ring resonator (SRR) and an equivalent circuit.
Figure 8:
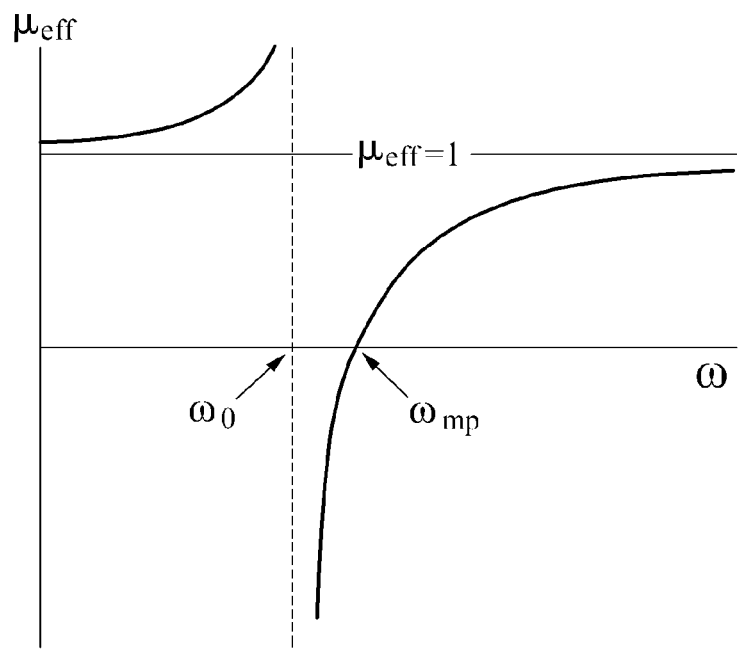
FIG. 8 is a graph illustrating an example of properties of an artificial magnetic material.

FIG. 7 illustrates an example of an SRR and an equivalent circuit, and FIG. 8 illustrates an example of properties of an artificial magnetic material, such as the SRR. A magnitude of a relative permeability of a metamaterial slab at a desired frequency may be greater than a value of 1, and a unit cell array of a magnetic dipole structure, e.g., the SRR, may be needed in order to form a magnetic material including negative mu properties in the metamaterial slab. That is, when the unit cell array of the magnetic dipole structure is inserted into the metamaterial slab, a permeability of the metamaterial slab may include a negative value.

Referring to FIGS. 7 and 8, when a magnetic field H(ω) enters the SRR in a direction vertical to a section of the SRR, a mu value $\mu_{eff}$ may become a negative value at a frequency ω greater than or equal to a resonance frequency $\omega_0$ of the SRR. The mu value $\mu_{eff}$ may become a positive value at the frequency ω greater than an artificial magnetic plasma frequency $\omega_{mp}$ of the SRR. In this example, the resonance frequency $\omega_0$ of the SRR to determine the negative mu properties, and the artificial magnetic plasma frequency $\omega_{mp}$ with positive mu properties, may be determined based on an array structure of FIG. 9.

Figure 9:
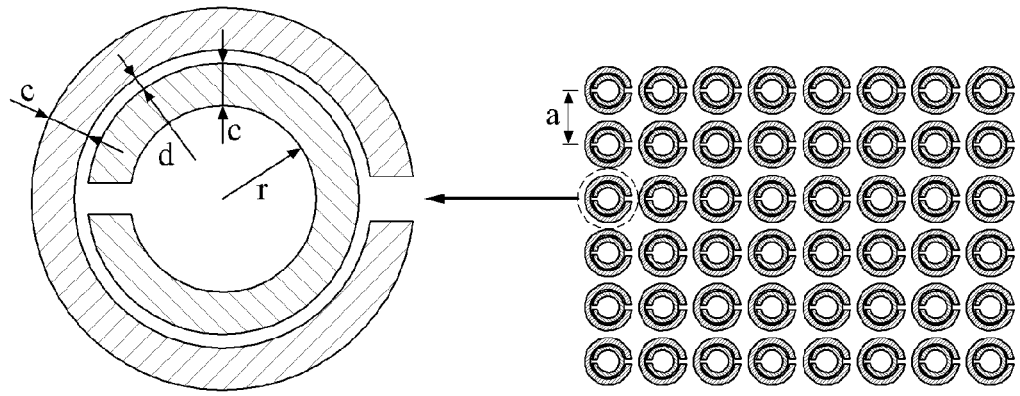
FIG. 9 is a diagram illustrating another example of an SRR array structure.

FIG. 9 illustrates an example of an SRR array structure. Referring to FIGS. 8 and 9, the artificial magnetic plasma frequency $\omega_{m9}$ with the positive mu properties may be determined based on the SRR array structure.

For example, the artificial magnetic plasma frequency $\omega_{mp}$ may be defined as expressed by the example of Equation 3.

$$\omega_{mp} = \sqrt{\frac{3}{\pi^2 \mu_0 C r^3 \left(1 - \frac{\pi r^2}{a^2}\right)}}, \quad (3)$$

where C denotes a capacitance component generated by two sheets constituting a magnetic dipole unit cell, e.g., a SRR, of the SRR array structure as shown on a left side of FIG. 9. As further shown in FIG. 9, a denotes an interval of the SRR array structure, and r denotes an internal radius of the unit cell. Each of the two sheets of the unit cell includes a thickness c, and the two sheets are separated by a distance d.

The resonance frequency $\omega_0$ of the SRR may be defined as expressed by the example of Equation 4.

$$\omega_0 = \sqrt{\frac{3}{\pi^2 \mu_0 C r^3}} \quad (4)$$

A magnetic metamaterial in which desired properties (e.g., negative mu properties) may be obtained at a desired frequency may be manufactured, by inserting at least one unit cell resonator (e.g., the SRR) including magnetic dipole properties into a metamaterial slab, and using an array arrangement (e.g., the SRR array structure). Also, instead of the unit cell as shown on the left side of FIG. 9, various types of magnetic dipole unit cell known to one of ordinary skill in the art may be used. As shown in FIG. 9, a magnetic dipole unit cell may include a loop-shaped conductor, and the loop-shaped conductor may generate a capacitance component associated with a resonance characteristic.

Figure 10A:
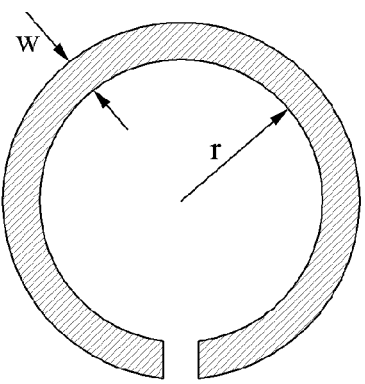
FIGS. 10A through 13 are diagrams illustrating examples of a magnetic dipole unit cell of an SRR array structure.
Figure 10B:
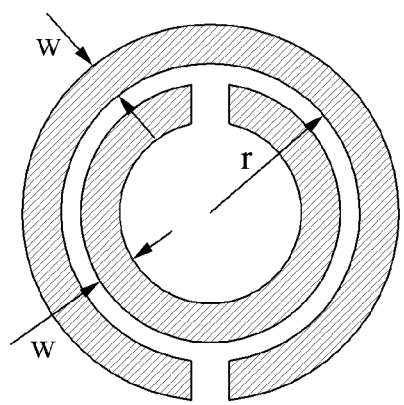
Figure 10C:
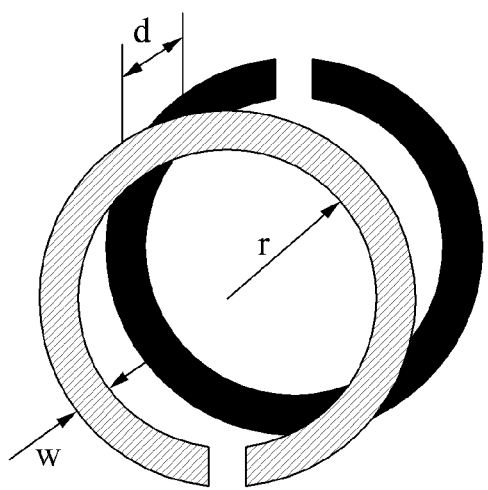
Figure 10D:
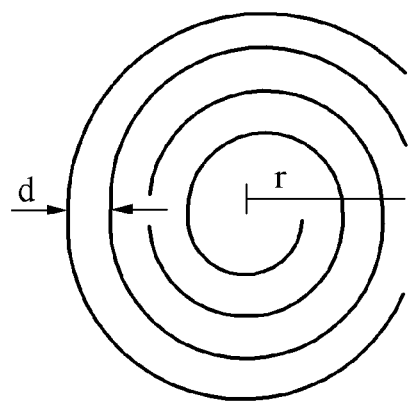

FIGS. 10A through 13 illustrate examples of a magnetic dipole unit cell of an SRR array structure. FIG. 10A illustrates an SRR including a single split ring with an internal radius r and a thickness w. FIG. 10B illustrates a double SRR including two split rings within each other and an internal radius r. Each of the two split rings includes a thickness w. FIG. 10C illustrates a modified SRR including two split rings parallel to each other and an internal radius r. Each of the two split rings include a thickness w, and the two sheets are separated by a distance d. The FIG. 10D illustrates a Swiss roll unit cell including wiring and an internal radius r. The wiring is separated by a distance d.

Figure 11:
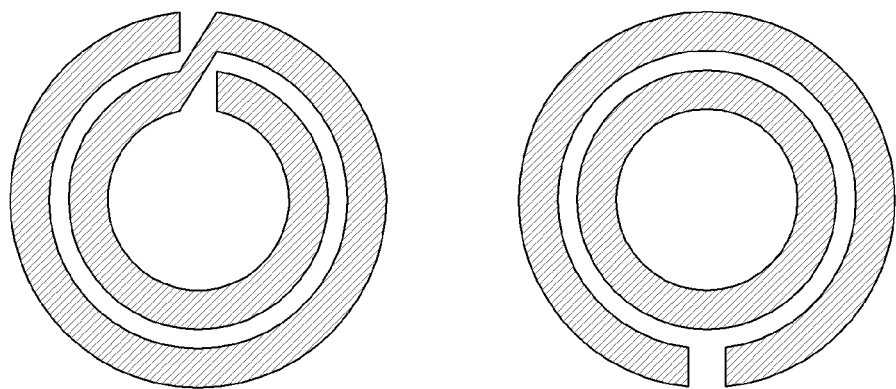
Figure 12:
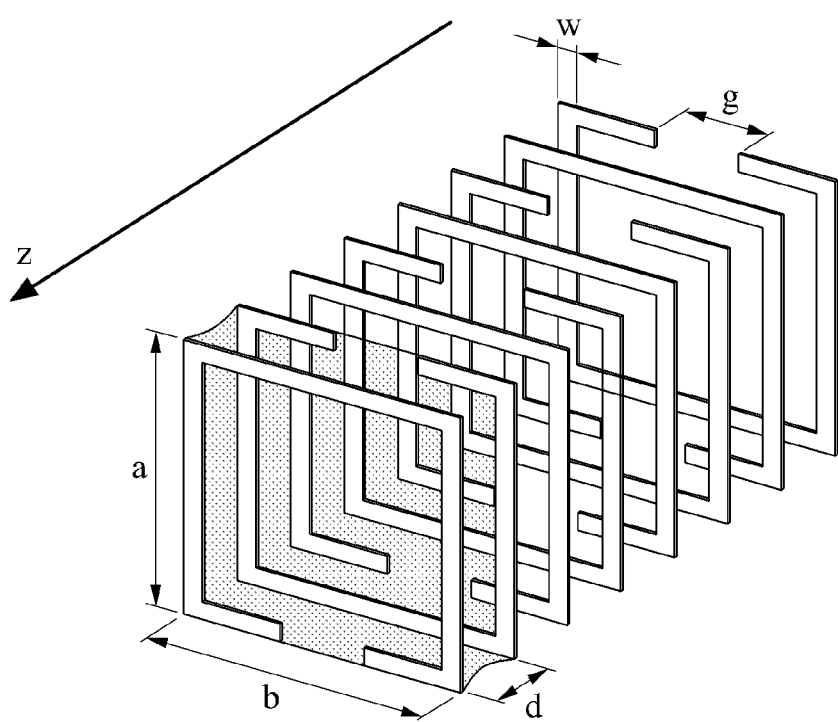

FIG. 11 illustrates a two-turn spiral resonator on a left side, and a single split double ring on a right side. FIG. 12 illustrates a metasolenoid structure including a plurality of rectangular solenoids in a direction of a z-axis. Each of the solenoids include distance dimensions a and b and a thickness w, and the solenoids are separated by a distance d. Split ends of each solenoid are separated by a distance g.

Figure 13:
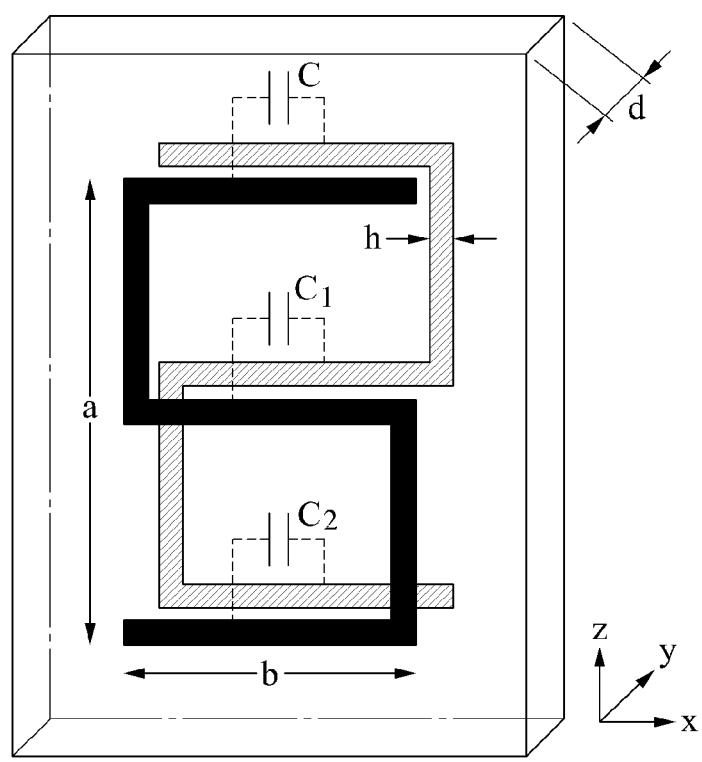

FIG. 13 illustrates an S-shaped resonator including two S-shaped sheets connected by capacitors C, $C_1$, and $C_2$. Each of the sheets include distance dimensions a and b in directions of a z-axis and a x-axis, respectively, and a thickness h, and the sheets are separated by a distance d in a direction of a y-axis.

Figure 14:
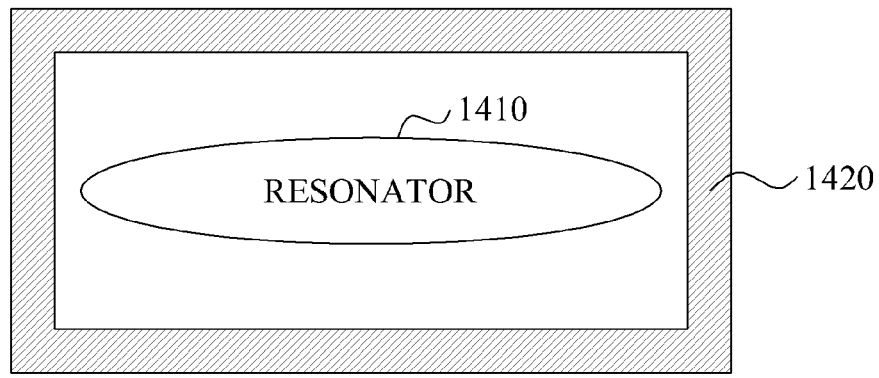
FIGS. 14 and 15 are diagrams illustrating examples of a resonator and a slab unit.
Figure 15:
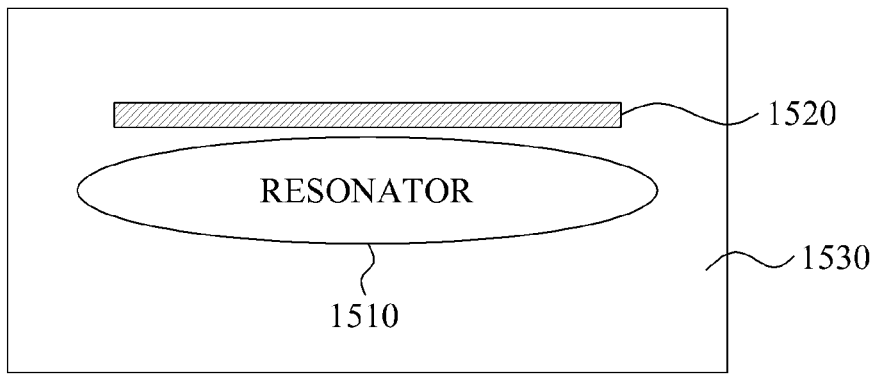

FIGS. 14 through 15 illustrate examples of a resonator and a slab unit. Referring to FIG. 14, a resonator 1410 and a slab unit 1420 are configured into a single package. Referring to FIG. 15, a resonator 1510 and a slab unit 1520 are also configured into a single package. That is, the resonator 1410 and the slab unit 1420 are integrally-manufactured, and the resonator 1510 and the slab unit 1520 are integrally-manufactured.

As shown in FIG. 14, the slab unit 1420 is configured to surround the resonator 1410. The slab unit 1420 may be disposed on an upper side, a lower side, a left side, a right side, or all of the upper, lower, left, and right sides, of the resonator 1410, based on the resonator 1410. That is, the slab unit 1420 may be disposed at various positions, based on a shape of a magnetic field occurring in the resonator 1410.

As shown in FIG. 15, the resonator 1510 and the slab unit 1520 are configured into a case 1530. In this example, the case 1530 may be formed of a material shielding a magnetic field. When the resonator 1510 corresponds to a source resonator, the case 1530 may be designed to shield a magnetic field towards a source system. That is, the case 1530 may be designed to include a shape in which the magnetic field may be shielded in a direction towards the source system, and a direction towards a target resonator may be open.

Figure 16A:
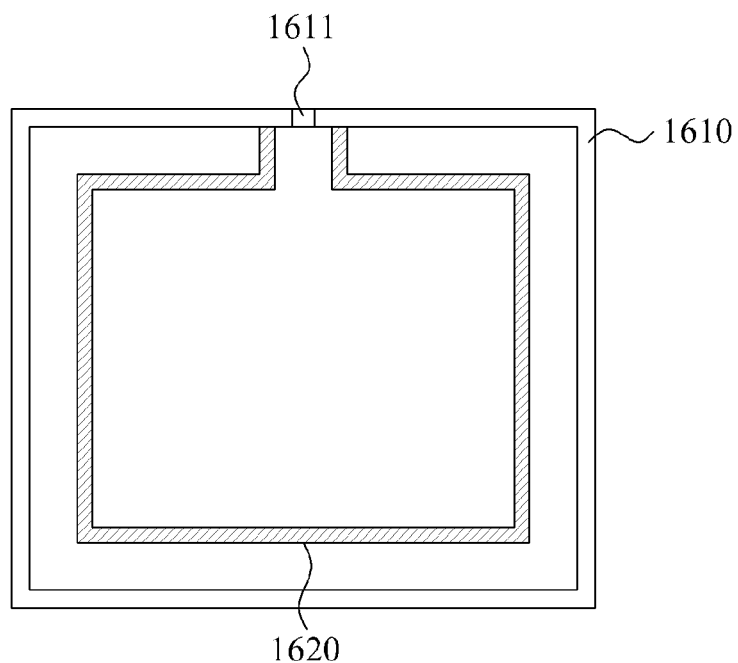
FIGS. 16A through 17B are diagrams illustrating an example of a rectangular loop resonator.

FIGS. 16A through 17B illustrate an example of a rectangular loop resonator. Referring to FIG. 16A, a wireless power transmitter includes a resonator 1610 and a feeding unit 1620. The resonator 1610 further includes a capacitor 1611. The feeding unit 1620 is electrically connected to both ends of the capacitor 1611.

Figure 16B:
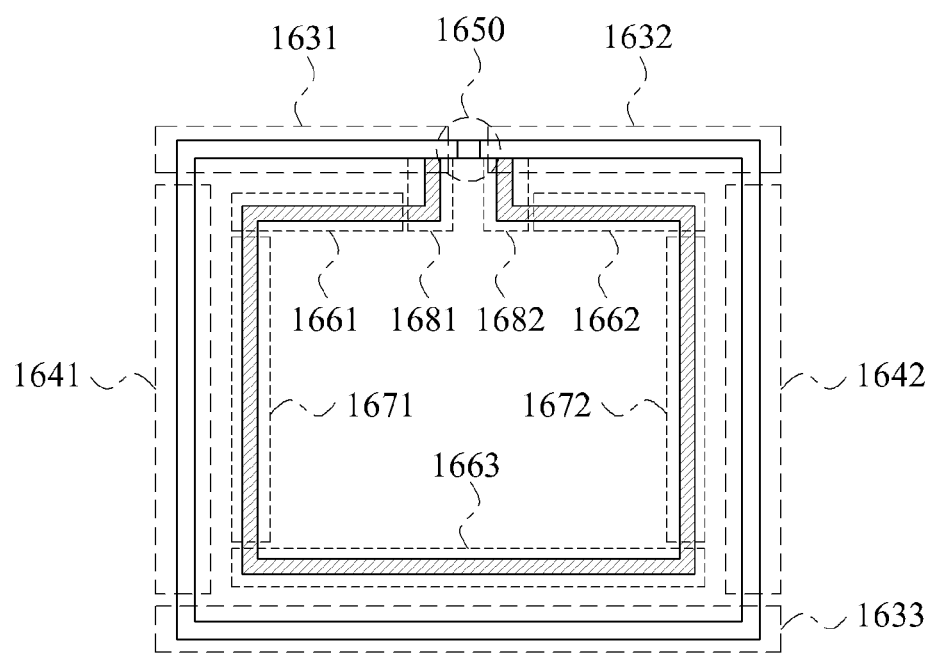

FIG. 16B illustrates, in greater detail, a structure of the wireless power transmitter of FIG. 16A. The resonator 1610 includes a first transmission line (not identified by a reference numeral in FIG. 16B, but formed by various elements in FIG. 16B as discussed below), a first conductor 1641, a second conductor 1642, and at least one capacitor 1650.

The capacitor 1650 is inserted in series between a first signal conducting portion 1631 and a second signal conducting portion 1632, causing an electric field to be confined within the capacitor 1650. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 16B is separated into two portions that will be referred to as the first signal conducting portion 1631 and the second signal conducting portion 1632. A conductor disposed in a lower portion of the first transmission line in FIG. 16B will be referred to as a first ground conducting portion 1633.

As illustrated in FIG. 16B, the resonator 1610 has a generally two-dimensional (2D) structure. The first transmission line includes the first signal conducting portion 1631 and the second signal conducting portion 1632 in the upper portion of the first transmission line, and includes the first ground conducting portion 1633 in the lower portion of the first transmission line. The first signal conducting portion 1631 and the second signal conducting portion 1632 are disposed to face the first ground conducting portion 1633. A current flows through the first signal conducting portion 1631 and the second signal conducting portion 1632.

One end of the first signal conducting portion 1631 is connected to one end of the first conductor 1641, the other end of the first signal conducting portion 1631 is connected to the capacitor 1650, and the other end of the first conductor 1641 is connected to one end of the first ground conducting portion 1633. One end of the second signal conducting portion 1632 is connected to one end of the second conductor 1642, the other end of the second signal conducting portion 1632 is connected to the other end of the capacitor 1650, and the other end of the second conductor 1642 is connected to the other end of the ground conducting portion 1633. Accordingly, the first signal conducting portion 1631, the second signal conducting portion 1632, the first ground conducting portion 1633, the first conductor 1641, and the second conductor 1642 are connected to each other, causing the resonator 1610 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 1650 is inserted into an intermediate portion of the first transmission line. In the example in FIG. 16B, the capacitor 1650 is inserted into a space between the first signal conducting portion 1631 and the second signal conducting portion 1632. The capacitor 1650 may be a lumped element capacitor, a distributed capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 1650 inserted into the first transmission line may cause the resonator 1610 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 1650 is a lumped element capacitor and a capacitance of the capacitor 1650 is appropriately determined, the resonator 1610 may have a characteristic of a metamaterial. If the resonator 1610 is caused to have a negative magnetic permeability by appropriately adjusting the capacitance of the capacitor 1650, the resonator 1610 may also be referred to as an MNG resonator. Various criteria may be applied to determine the capacitance of the capacitor 1650. For example, the various criteria may include a criterion for enabling the resonator 1610 to have the characteristic of the metamaterial, a criterion for enabling the resonator 1610 to have a negative magnetic permeability at a target frequency, a criterion for enabling the resonator 1610 to have a zeroth order resonance characteristic at the target frequency, and any other suitable criterion. Based on any one or any combination of the aforementioned criteria, the capacitance of the capacitor 1650 may be appropriately determined.

The resonator 1610, hereinafter referred to as the MNG resonator 1610, may have a zeroth order resonance characteristic of having a resonance frequency when a propagation constant is "0". If the MNG resonator 1610 has the zeroth order resonance characteristic, the resonance frequency is independent of a physical size of the MNG resonator 1610. By changing the capacitance of the capacitor 1650, the resonance frequency of the MNG resonator 1610 may be changed without changing the physical size of the MNG resonator 1610.

In a near field, the electric field is concentrated in the capacitor 1650 inserted into the first transmission line, causing the magnetic field to become dominant in the near field. The MNG resonator 1610 has a relatively high Q-factor when the capacitor 1650 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 16B, a magnetic core passing through the MNG resonator 1610 may be provided to increase a power transmission distance.

Referring to FIG. 16B, the feeding unit 1620 includes a second transmission line (not identified by a reference numeral in FIG. 16B, but formed by various elements in FIG. 16B as discussed below), a third conductor 1671, a fourth conductor 1672, a fifth conductor 1681, and a sixth conductor 1682.

The second transmission line includes a third signal conducting portion 1661 and a fourth signal conducting portion 1662 in an upper portion of the second transmission line, and includes a second ground conducting portion 1663 in a lower portion of the second transmission line. The third signal conducting portion 1661 and the fourth signal conducting portion 1662 are disposed to face the second ground conducting portion 1663. A current flows through the third signal conducting portion 1661 and the fourth signal conducting portion 1662.

One end of the third signal conducting portion 1661 is connected to one end of the third conductor 1671, the other end of the third signal conducting portion 1661 is connected to one end of the fifth conductor 1681, and the other end of the third conductor 1671 is connected to one end of the second ground conducting portion 1663. One end of the fourth signal conducting portion 1662 is connected to one end of the fourth conductor 1672, the other end of the fourth signal conducting portion 1662 is connected to one end the sixth conductor 1682, and the other end of the fourth conductor 1672 is connected to the other end of the second ground conducting portion 1663. The other end of the fifth conductor 1681 is connected to the first signal conducting portion 1631 at or near where the first signal conducting portion 1631 is connected to one end of the capacitor 1650, and the other end of the sixth conductor 1682 is connected to the second signal conducting portion 1632 at or near where the second signal conducting portion 1632 is connected to the other end of the capacitor 1650. Thus, the fifth conductor 1681 and the sixth conductor 1682 are connected in parallel to both ends of the capacitor 1650. The fifth conductor 1681 and the sixth conductor 1682 are used as an input port to receive an RF signal as an input.

Accordingly, the third signal conducting portion 1661, the fourth signal conducting portion 1662, the second ground conducting portion 1663, the third conductor 1671, the fourth conductor 1672, the fifth conductor 1681, the sixth conductor 1682, and the resonator 1610 are connected to each other, causing the resonator 1610 and the feeding unit 1620 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 1681 or the sixth conductor 1682, input current flows through the feeding unit 1620 and the resonator 1610, generating a magnetic field that induces a current in the resonator 1610. A direction of the input current flowing through the feeding unit 1620 is identical to a direction of the induced current flowing through the resonator 1610, thereby causing a strength of a total magnetic field to increase in the center of the resonator 1610, and decrease near the outer periphery of the resonator 1610.

An input impedance is determined by an area of a region between the resonator 1610 and the feeding unit 1620. Accordingly, a separate matching network used to match the input impedance to an output impedance of a power amplifier may not be necessary. However, if a matching network is used, the input impedance may be adjusted by adjusting a size of the feeding unit 1620, and accordingly a structure of the matching network may be simplified. The simplified structure of the matching network may reduce a matching loss of the matching network.

The second transmission line, the third conductor 1671, the fourth conductor 1672, the fifth conductor 1681, and the sixth conductor 1682 of the feeding unit may have a structure identical to the structure of the resonator 1610. For example, if the resonator 1610 has a loop structure, the feeding unit 1620 may also have a loop structure. As another example, if the resonator 1610 has a circular structure, the feeding unit 1620 may also have a circular structure.

The above-described configurations of the resonator 1610 and the feeding unit 1620 may be applied identically to configurations of a target resonator and a feeding unit of the target resonator. In a wireless power transmission, feeding may refer to supplying a power to a source resonator. The feeding may also refer to supplying an AC power to a rectification unit.

Figure 17A:
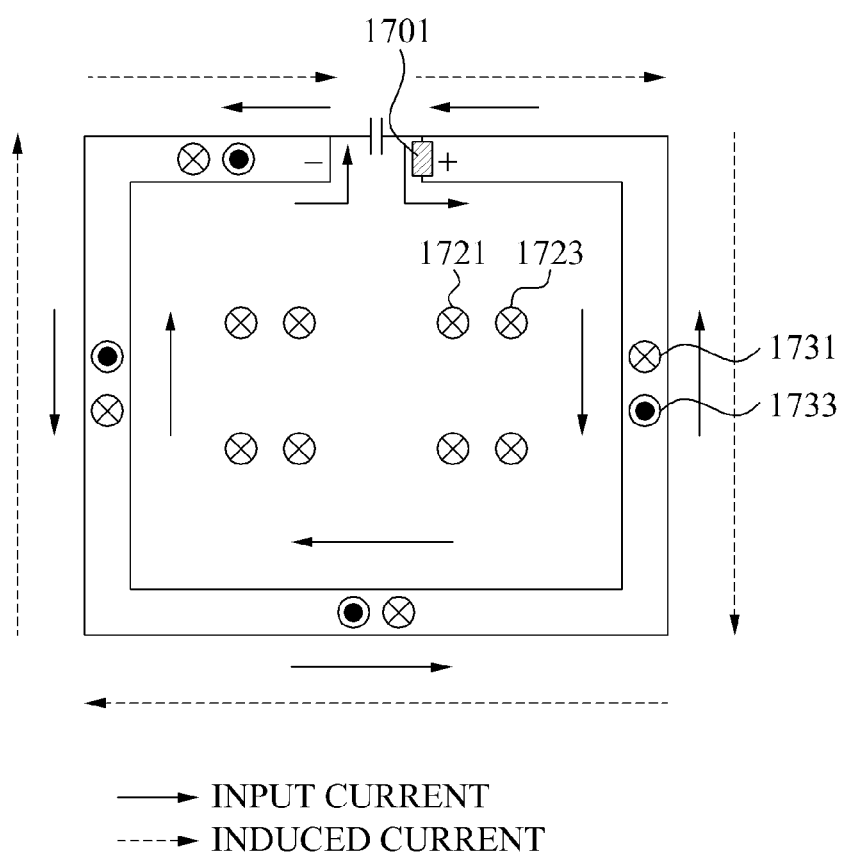

FIG. 17A illustrates an example of a distribution of a magnetic field in a resonator that is produced by feeding of a feeding unit, of a wireless power transmitter. FIG. 17A more simply illustrates the resonator 1610 and the feeding unit 1620 of FIGS. 16A and 16B, and the names of the various elements in FIG. 16B will be used in the following description of FIG. 17A without reference numerals.

A feeding operation may be an operation of supplying power to a source resonator in wireless power transmission, or an operation of supplying AC power to a rectification unit in wireless power transmission. FIG. 17A illustrates a direction of input current flowing in the feeding unit, and a direction of induced current flowing in the source resonator. Additionally, FIG. 17A illustrates a direction of a magnetic field formed by the input current of the feeding unit, and a direction of a magnetic field formed by the induced current of the source resonator.

Referring to FIG. 17A, the fifth conductor or the sixth conductor of the feeding unit 1620 may be used as an input port 1701. In FIG. 17A, the sixth conductor of the feeding unit is being used as the input port 1701. An RF signal is input to the input port 1701. The RF signal may be output from a power amplifier. The power amplifier may increase and decrease an amplitude of the RF signal based on a power requirement of a target device. The RF signal input to the input port 1701 is represented in FIG. 17A as an input current flowing in the feeding unit. The input current flows in a clockwise direction in the feeding unit along the second transmission line of the feeding unit. The fifth conductor and the sixth conductor of the feeding unit are electrically connected to the resonator. More specifically, the fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 17A, the input current flowing in the feeding unit and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 17A, within the feeding unit, a direction 1721 of the magnetic field generated by the input current flowing in the feeding unit is identical to a direction 1723 of the magnetic field generated by the induced current flowing in the resonator. Accordingly, a strength of the total magnetic field may increase inside the feeding unit.

In contrast, as illustrated in FIG. 17A, in a region between the feeding unit and the resonator, a direction 1733 of the magnetic field generated by the input current flowing in the feeding unit is opposite to a direction 1731 of the magnetic field generated by the induced current flowing in the source resonator. Accordingly, the strength of the total magnetic field decreases in the region between the feeding unit and the resonator.

Typically, in a resonator having a loop structure, a strength of a magnetic field decreases in the center of the resonator, and increases near an outer periphery of the resonator. However, referring to FIG. 17A, since the feeding unit is electrically connected to both ends of the capacitor of the resonator, the direction of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 17B:
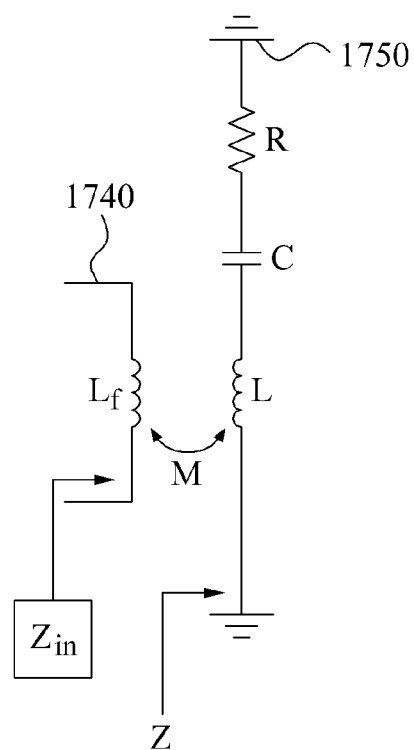

FIG. 17B illustrates examples of equivalent circuits of a feeding unit and a resonator of a wireless power transmitter. Referring to FIG. 17B, a feeding unit 1740 and a resonator 1750 may be represented by the equivalent circuits in FIG. 17B. The feeding unit 1740 is represented as an inductor having an inductance $L_f$, and the resonator 1750 is represented as a series connection of an inductor having an inductance L coupled to the inductance $L_f$ of the feeding unit 1740 by a mutual inductance M, a capacitor having a capacitance C, and a resistor having a resistance R. An example of an input impedance $Z_{in}$ viewed in a direction from the feeding unit 1740 to the resonator 1750 may be expressed by the following Equation 4:

$$Z_{in} = \frac{(\omega M)^2}{Z} \qquad (5)$$

In Equation 4, M denotes a mutual inductance between the feeding unit 1740 and the resonator 1750, ω denotes a resonance frequency of the feeding unit 1740 and the resonator 1750, and Z denotes an impedance viewed in a direction from the resonator 1750 to a target device. As can be seen from Equation 4, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 1740 and the resonator 1750. The area of the region between the feeding unit 1740 and the resonator 1750 may be adjusted by adjusting a size of the feeding unit 1740, thereby adjusting the mutual inductance M and the input impedance $Z_{in}$. Since the input impedance $Z_{in}$ may be adjusted by adjusting the size of the feeding unit 1740, it may be unnecessary to use a separate matching network to perform impedance matching with an output impedance of a power amplifier.

Figure 18:
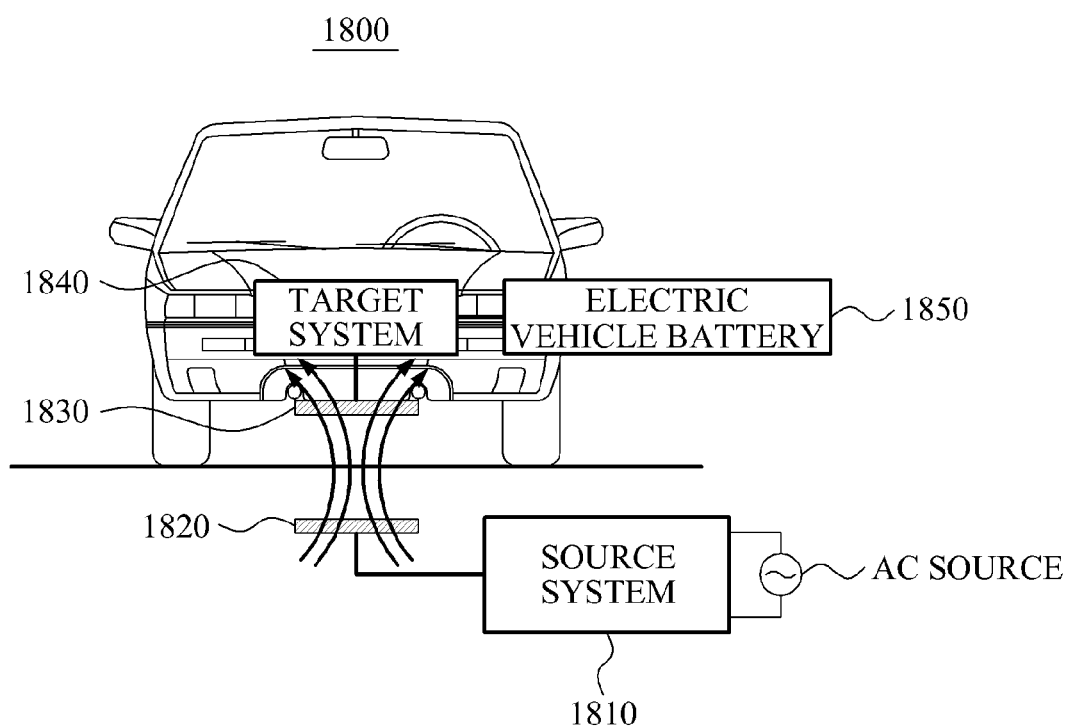
FIG. 18 is a diagram illustrating an example of an electric vehicle charging system.

FIG. 18 illustrates an example of an electric vehicle charging system. Referring to FIG. 18, an electric vehicle charging system 1800 includes a source system 1810, a source resonator 1820, a target resonator 1830, a target system 1840, and an electric vehicle battery 1850.

In one example, the electric vehicle charging system 1800 has a structure similar to the structure of the wireless power transmission system of FIG. 1. The source system 1810 and the source resonator 1820 in the electric vehicle charging system 1800 operate as a source. The target resonator 1830 and the target system 1840 in the electric vehicle charging system 1800 operate as a target.

In one example, the source system 1810 includes an alternating current-to-direct current (AC/DC) converter, a power detector, a power converter, a control and communication (control/communication) unit similar to those of the source device 110 of FIG. 1. In one example, the target system 1840 includes a rectification unit, a DC-to-DC (DC/DC) converter, a switch unit, a charging unit, and a control/communication unit similar to those of the target device 120 of FIG. 1. The electric vehicle battery 1850 is charged by the target system 1840. The electric vehicle charging system 1800 may use a resonant frequency in a band of a few kHz to tens of MHz.

The source system 1810 generates power based on a type of the vehicle being charged, a capacity of the electric vehicle battery 1850, and a charging state of the electric vehicle battery 1850, and wirelessly transmits the generated power to the target system 1840 via a magnetic coupling between the source resonator 1820 and the target resonator 1830.

The source system 1810 may control an alignment of the source resonator 1820 and the target resonator 1830. For example, when the source resonator 1820 and the target resonator 1830 are not aligned, the controller of the source system 1810 may transmit a message to the target system 1840 to control the alignment of the source resonator 1820 and the target resonator 1830.

For example, when the target resonator 1830 is not located in a position enabling maximum magnetic coupling, the source resonator 1820 and the target resonator 1830 are not properly aligned. When a vehicle does not stop at a proper position to accurately align the source resonator 1820 and the target resonator 1830, the source system 1810 may instruct a position of the vehicle to be adjusted to control the source resonator 1820 and the target resonator 1830 to be aligned. However, this is just an example, and other methods of aligning the source resonator 1820 and the target resonator 1830 may be used.

The source system 1810 and the target system 1840 may transmit or receive an ID of a vehicle and exchange various messages by performing communication with each other.

The descriptions of FIGS. 2 through 17B are also applicable to the electric vehicle charging system 1800. However, the electric vehicle charging system 1800 may use a resonant frequency in a band of a few kHz to tens of MHz, and may wirelessly transmit power that is equal to or higher than tens of watts to charge the electric vehicle battery 1850.

According to the teachings above, there is provided a wireless power transmission system with an enhanced magnetic field strength, which amplifies a near field occurring in a resonator to increase a transmission distance and a transmission efficiency.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the above-described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter comprising:
a generator configured to generate a power;
a resonator configured to generate a magnetic field to transmit the power to a target device; and
a slab unit configured to enhance the magnetic field
wherein the slab unit comprises
a metamaterial comprising an electric dipole structure and a magnetic dipole structure,
wherein a relative permittivity at the metamaterial is determined based on the electric dipole structure and a relative permeability of the metamaterial is determined based on the magnetic dipole structure,
wherein the magnetic dipole structure comprises a loop-shaped conductor configured to generate a capacitance associated with a resonance characteristic and wherein the capacitance is determined to have a zeroth order resonance for the resonator at a target frequency of transmitting the power.

2. The wireless power transmitter of claim 1, wherein:
the slab unit comprises a metamaterial; and
at least one of a permittivity and a permeability of the metamaterial comprises a negative value.

3. The wireless power transmitter of claim 1, wherein:
the slab unit comprises a metamaterial; and
a relative permittivity of the metamaterial and a relative permeability of the metamaterial are identical to each other.

4. The wireless power transmitter of claim 1, wherein:
the slab unit comprises a metamaterial;
a relative permeability of the metamaterial is greater than a value of 1; and
a magnitude of a relative permittivity of the metamaterial and a magnitude of the relative permeability are identical to each other.

5. The wireless power transmitter of claim 1, wherein:
the slab unit comprises a metamaterial; and
a difference between a relative permittivity of the metamaterial and a relative permeability of the metamaterial is less than 20%.

6. The wireless power transmitter of claim 1, wherein:
the electric dipole structure and the magnetic dipole structure are arranged in the slab unit in a form of an array.

7. The wireless power transmitter of claim 1, wherein:
an area the slab unit is greater than or equal to an area of the resonator.

8. The wireless power transmitter of claim 1, wherein:
the resonator and the slab unit are configured into a single package.

9. The wireless power transmitter of claim 1, wherein:
the slab unit comprises a metamaterial; and
an impedance of the metamaterial and an impedance of air are identical to each other.

* * * * *